(12) United States Patent
Engelbreit

(10) Patent No.: US 10,780,534 B2
(45) Date of Patent: Sep. 22, 2020

(54) METHOD AND ASSEMBLY INSTALLATION FOR AUTOMATICALLY JOINING COMPONENTS

(71) Applicant: ENGELBREIT & SOHN GMBH CNC-ZERSPANUNG, Roethenbach (DE)

(72) Inventor: Philipp Engelbreit, Lauf (DE)

(73) Assignee: Engelbreit & Sohn GmbH CNC-Zerspanung, Roethenbach (DE)

(*) Notice: Subject to any disclaimer, the term of this patent is extended or adjusted under 35 U.S.C. 154(b) by 605 days.

(21) Appl. No.: 15/246,761

(22) Filed: Aug. 25, 2016

(65) Prior Publication Data

US 2016/0361785 A1 Dec. 15, 2016

Related U.S. Application Data

(63) Continuation of application No. PCT/EP2015/000410, filed on Feb. 24, 2015.

(30) Foreign Application Priority Data

Feb. 25, 2014 (DE) .................. 20 2014 001 697 U

(51) Int. Cl.
  *B23P 19/04* (2006.01)
  *B23P 19/10* (2006.01)

(52) U.S. Cl.
  CPC .............. *B23P 19/04* (2013.01); *B23P 19/10* (2013.01); *B23P 2700/50* (2013.01); *Y10T 29/49876* (2015.01); *Y10T 29/53* (2015.01)

(58) Field of Classification Search
  CPC ....... B23P 19/04; B23P 19/10; B23P 2700/50; B21D 39/03–032; H01R 43/048;
  (Continued)

(56) References Cited

U.S. PATENT DOCUMENTS 4,453,085 A 6/1984 Pryor
4,689,979 A * 9/1987 Otsuka ................. B21D 22/22
                                                      72/57

(Continued)

FOREIGN PATENT DOCUMENTS

DE          3302177 A1    8/1983
DE          261 969 A1    11/1988
                (Continued)

*Primary Examiner* — Sarang Afzali
(74) *Attorney, Agent, or Firm* — Laurence A. Greenberg; Werner H. Stemer; Ralph E. Locher

(57) ABSTRACT

A method and an assembly installation for implementing the method automatically joining components, in particular of a motor vehicle-side radiator grill with a chrome frame, and/or a radiator grill of this type with a chrome strip, in an assembly installation. In a first step, a second component is positioned on a first component or a third component is positioned on the second component thus forming a complete component. In a second step, the complete component is placed in a horizontally-oriented component receiving device of the assembly installation and in a third step an installation-side stamping device is guided in the direction of the complete component in such a manner, in particular lowered vertically, that the complete component is influenced in an end position of the stamping device with a pressing force that provides a latching arrangement or pressing arrangement of the components.

11 Claims, 4 Drawing Sheets

(58) Field of Classification Search
CPC . H01R 43/058; Y10T 29/49769; Y10T 29/53; Y10T 29/5303; Y10T 29/53087; Y10T 29/5327
See application file for complete search history.

(56) References Cited

U.S. PATENT DOCUMENTS

| | | | | |
|---|---|---|---|---|
| 5,027,683 | A | * | 7/1991 | Kakimoto ............ B26D 7/2628 72/444 |
| 5,148,591 | A | | 9/1992 | Pryor |
| 5,206,990 | A | * | 5/1993 | Wright ................ B21D 53/08 29/726 |
| 6,944,941 | B2 | * | 9/2005 | Ehrfeld ................ B23P 19/001 29/729 |
| 7,798,315 | B2 | * | 9/2010 | Shun ..................... B65G 21/06 198/836.3 |
| 8,701,275 | B2 | | 4/2014 | Kagaya |
| 9,365,177 | B2 | | 6/2016 | Bachmann et al. |
| 2004/0148997 | A1 | * | 8/2004 | Amino ................... B21D 11/02 72/297 |
| 2013/0212858 | A1 | | 8/2013 | Herzinger et al. |
| 2015/0175220 | A1 | | 6/2015 | Jones et al. |

FOREIGN PATENT DOCUMENTS

| | | |
|---|---|---|
| DE | 4326153 A1 | 2/1994 |
| DE | 202004007595 U1 | 7/2004 |
| DE | 602004010912 T2 | 1/2009 |
| DE | 202005021764 U1 | 12/2009 |
| DE | 102009023123 A1 | 1/2010 |
| DE | 102010041356 A1 | 3/2012 |
| DE | 102012002722 A1 | 3/2013 |
| KR | 20100042872 A | 4/2010 |
| WO | 2014009271 A1 | 1/2014 |

* cited by examiner

METHOD AND ASSEMBLY INSTALLATION FOR AUTOMATICALLY JOINING COMPONENTS

CROSS-REFERENCE TO RELATED APPLICATION

This is a continuation application, under 35 U.S.C. § 120, of copending international application No. PCT/EP2015/000410, filed Feb. 24, 2015, which designated the United States; this application also claims the priority, under 35 U.S.C. § 119, of German patent application No. DE 20 2014 001 697.6, filed Feb. 25, 2014; the prior applications are herewith incorporated by reference in their entirety.

BACKGROUND OF THE INVENTION

Field of the Invention

The invention relates to a method for automatically joining components, in particular of a motor vehicle-side radiator grill with a chrome frame, and/or a radiator grill of this type with a chrome strip. The invention further relates to an assembly installation for implementing the method.

It is known in particular in the automotive industry to provide functional synthetic material components with chrome and/or paint applications depending upon the design variant of a motor vehicle model. These applications are generally likewise synthetic material components that have been coated with a chrome and/or paint layer and are attached in the visible area to the generally untreated, functional synthetic material component. The applications are performed geometrically in such a manner that it appears optically that the functional component has itself likewise been coated with this chrome coating and/or paint coating at the site that is provided for this purpose. This measure has the advantage that within the scope of embodying the variant it is only necessary to adjust the applications while the mostly larger functional component can be used unchanged as a base component. The applications on the functional synthetic material component are fastened to a complete component at exposed sites by latching and/or pressing. Hitherto it is only known for these joining operations to be performed manually and thereby in addition to the high expenditure associated therewith, in particular in terms of costs, it is necessary to take into account a specific error rate or drop in quality.

SUMMARY OF THE INVENTION

The object of the invention is to provide a suitable method to automatically joining components, in particular a motor vehicle-side radiator grill with a chrome frame and/or a radiator grill of this type with a chrome strip. Furthermore, an assembly installation that is particularly suited to this purpose is to be provided.

For this purpose, it is provided in a first step to position a second component on a first component or to position a third component on the second component while forming a complete component. In a second step, the complete component is placed in a preferably essentially horizontally-oriented component receiving device of the assembly installation. In a third step, an installation-side stamping device is guided in the direction of the complete component, in particular vertically lowered, in such a manner that the complete component is influenced in an end position of the stamping device with a pressing force that provides a latching or pressing arrangement of the components.

In an advantageous further development, after the second step a fixing arrangement of the complete component, the fixing arrangement being supported by an external force is provided by component receiving device-side fixing elements. These fixing elements are preferably formed by cylinders that can be pneumatically or hydraulically actuated, the cylinders being fitted with grippers on the side that is facing the complete component. After manually placing or placing the complete component in a manner supported by an automated process into the component receiving device, these grippers ensure that the complete component is fixed and positioned precisely with respect to the stamping device so as to perform the third step without error. The fixing arrangement advantageously occurs in the region of the latching arrangement or pressing arrangement. The reason for this is that at these sites it is possible owing to the introduction of force for a preferred displacement of the complete component to occur.

Furthermore, it is expedient that the second step occurs in a placing position of the component receiving device that is located outside the effective area of the stamping device. The third step occurs in an assembly position of the component receiving device while the component receiving device can be transferred in a manner supported by an external force from the placing position into the assembly position. This has the advantage that it is already possible to simultaneously fit a further component receiving device with another complete component when performing the third step. In addition, it is advantageous for an installer for ergonomic reasons that the component receiving device can be fitted outside the effective area of the stamping device since the stamping device is located at head height.

An installation-side camera system suitably checks chronologically prior to or after the third step, preferably in the placing position, whether the components are arranged in their desired position. The camera system is provided for the purpose of checking the complete component with regard to the latching or pressing state.

The latched or pressed complete component, in particular the complete component that has been checked by the camera system, is provided with a label by an installation-side labeling machine so as to identify the finished complete components. In particular, in connection with the camera system it is possible for the complete component that is found to be "in order" to be provided with a label in the assembly position by the integrated labeling machine for the purposes of tracking.

The assembly installation for implementing the method contains an essentially horizontally-oriented component receiving device that is provided and configured for the purpose of fixing one of the components or a pre-assembled complete component, and a stamping device that is provided and configured so as to lower vertically into an end position in such a manner that in the end position a measured vertical pressing force is exerted onto the complete component, the vertical pressing force being of such a measured amount as to suit the latching or pressing together of the components involved. The pressing force is of such a measured amount the vertically acting force is large enough for the individual components to be individually securely latched or sufficiently pressed together. A destruction of the components as a result of high pressing forces such as can occur for example in the case of a manual assembly, is thus reliably avoided.

In an advantageous embodiment, the component receiving device contains fixing elements, in particular cylinders, for fixing the complete component, the fixing elements being supported by an external force. In addition, it is expedient if the component receiving device and the stamping device contain in each case a surface characteristic that corresponds to the respective surface contour of the complete component. It is possible by this measure to exert force over a larger surface onto the complete component as a result of which the mechanical load is reduced.

Furthermore, the stamping surface of the stamping device that is facing the complete component should be suitably provided with a rubber coating. This has the advantage that the chrome coating and/or paint coating that is sensitive to any type of external influence is not damaged.

In addition, the assembly installation expediently contains an externally-actuated table in order to transfer the component receiving device from a placing position that is located outside the effective area of the stamping device into an assembly position below the stamping device. The externally-actuated method of the table ensures that the table is brought into the same position during every joining procedure.

Other features which are considered as characteristic for the invention are set forth in the appended claims.

Although the invention is illustrated and described herein as embodied in a method and an assembly installation for automatically joining components, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
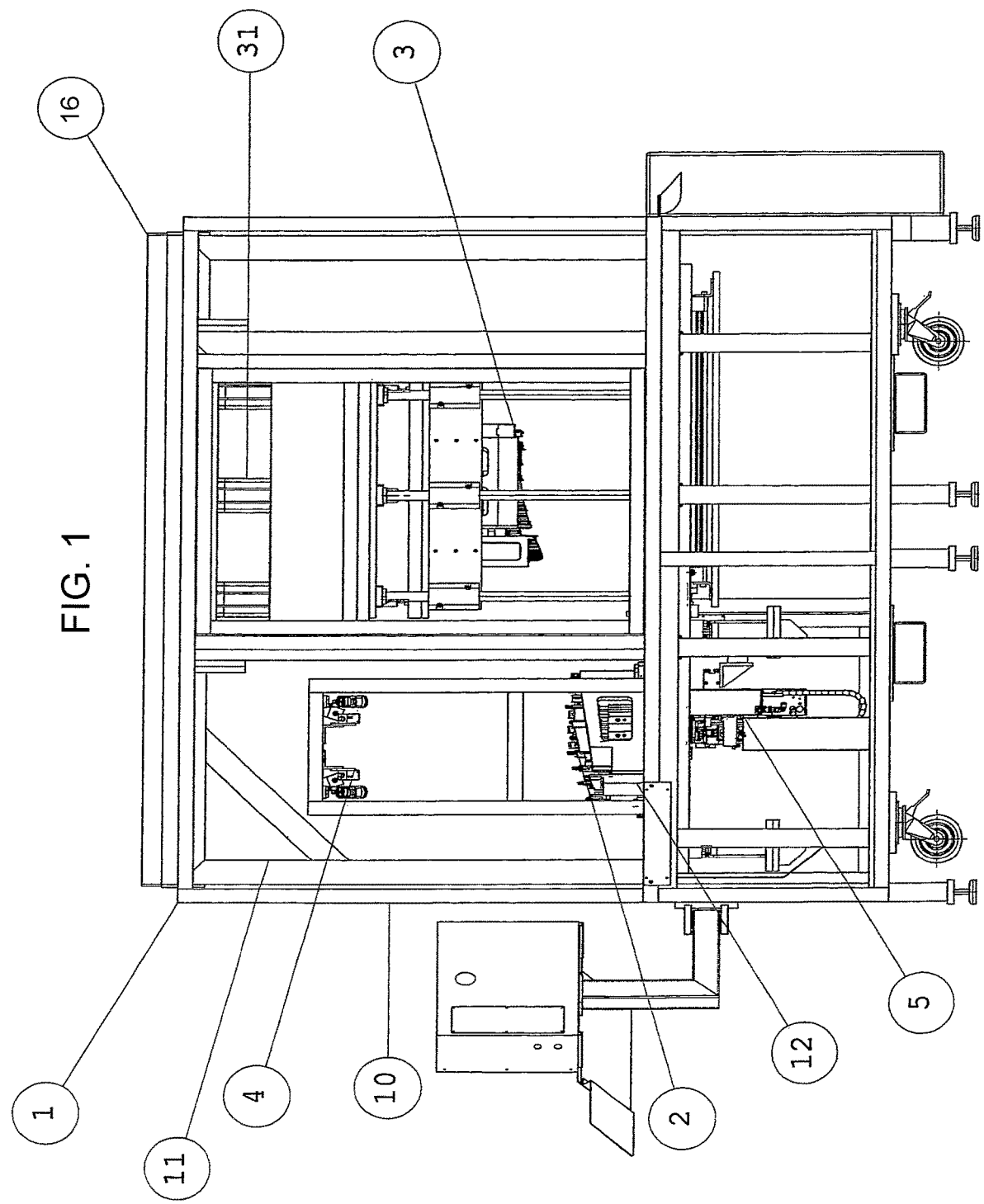
FIG. 1 is a diagrammatic, front view of an assembly installation with a stamping device that can be lowered and a component receiving device in a lateral starting position for this purpose for automatically latching a motor vehicle-side radiator grill with a chrome frame and with a chrome strip according to the invention.

Components that correspond to one another are provided in all the figures with identical reference numerals.

Figure 2:
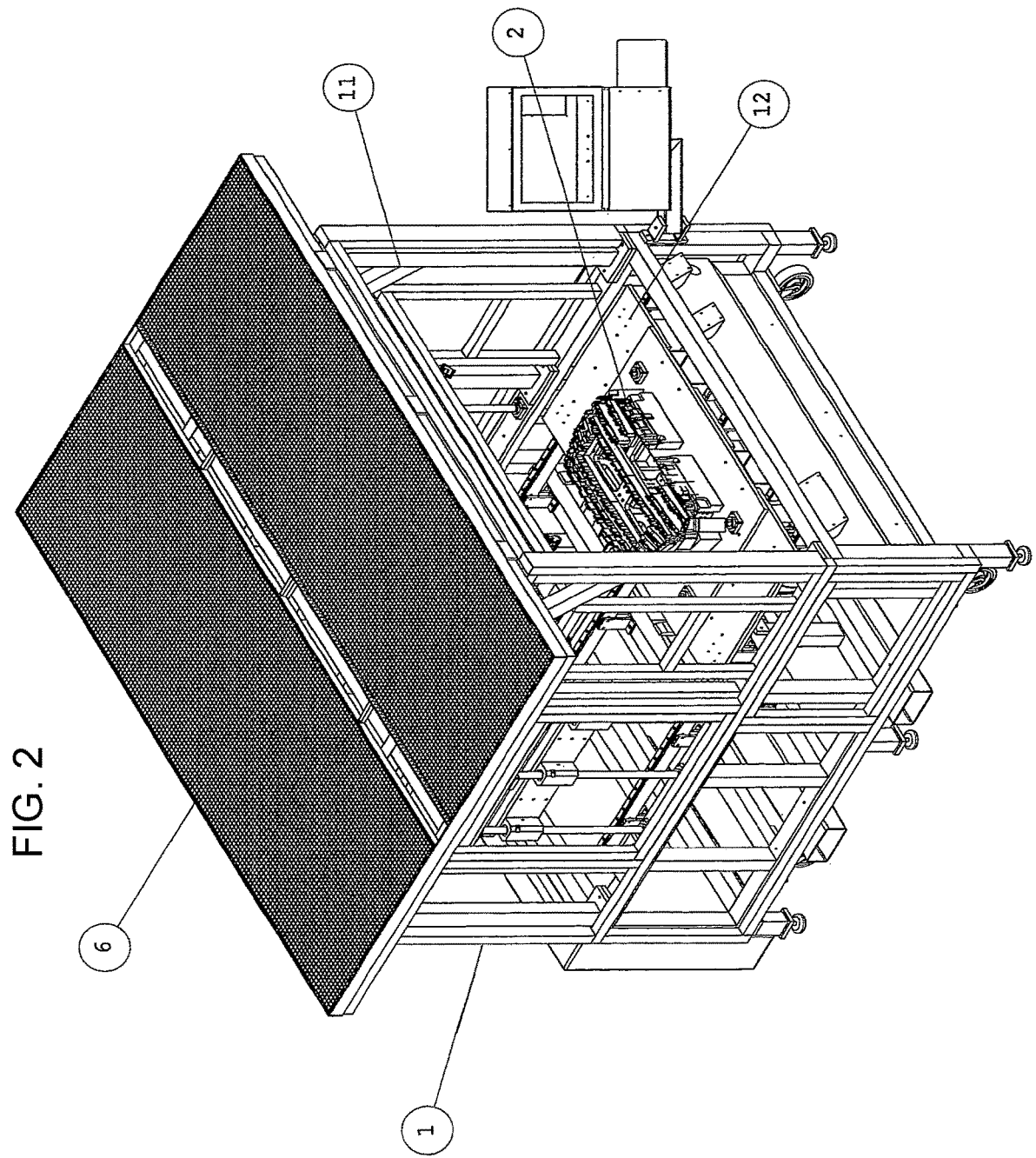
FIG. 2 is a perspective view of the assembly installation with a component receiving device that is positioned below the stamping device.
Figure 3:
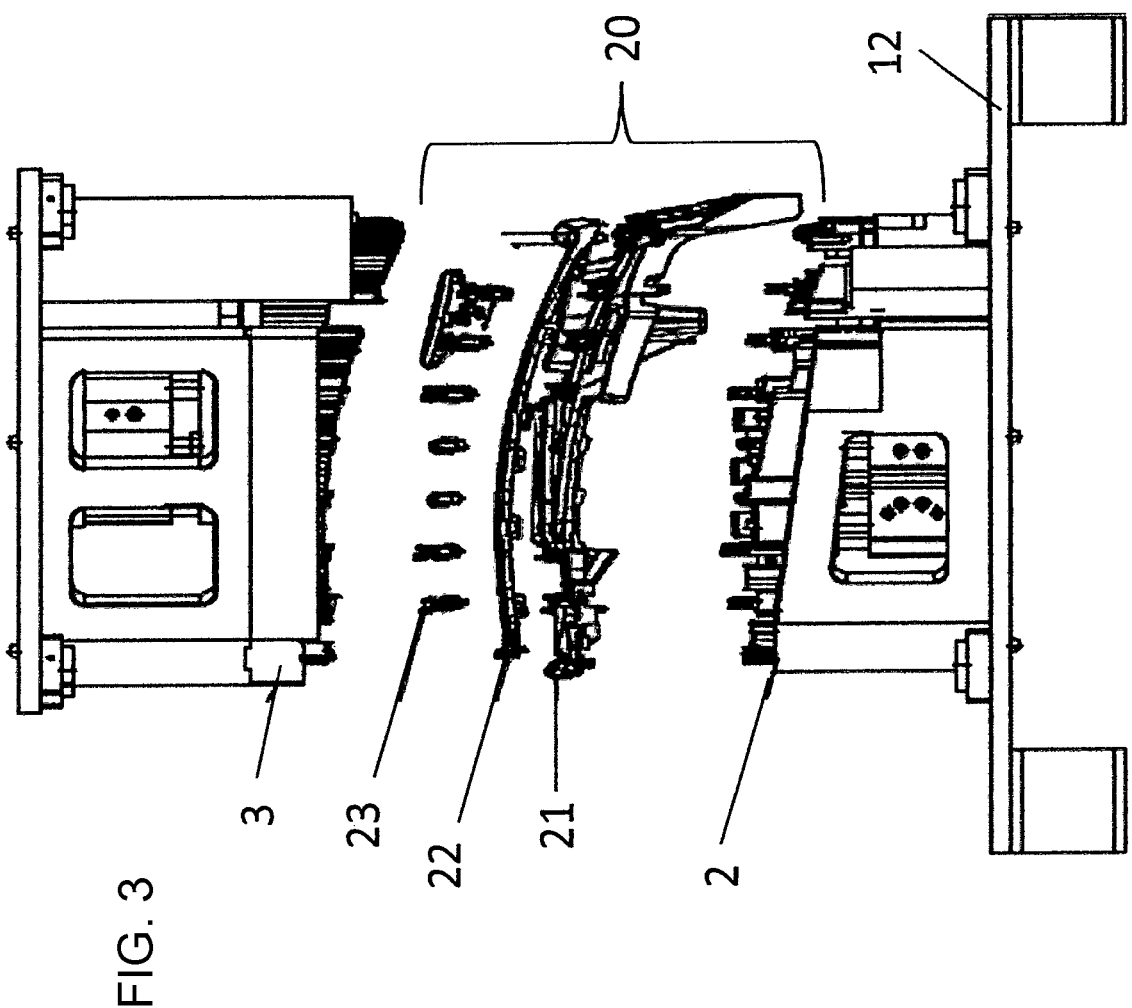
FIG. 3 is an exploded view of the components that are positioned between the component receiving device and the stamping device of the assembly installation.

Referring now to the figures of the drawings in detail and first, particularly to FIGS. 1 and 2 thereof, there is shown a front-side open or opened, square compartment 10 in which the components of an assembly installation 1 are attached to a frame construction 11. At approximately waist height of an averagely sized worker, the assembly installation 1 contains a horizontally-oriented component receiving device 2 that is suitable for the purpose of receiving or fixing a complete component 20 (FIG. 3) by fixing elements that can be actuated or fixed in a hydraulic or pneumatic manner. The complete component 20 is embodied from a radiator protective grid (radiator grill) 21, a chrome frame 22 and where appropriate chrome strips 23 that are pre-assembled either in the component receiving device 2 or in a separate assembly space that is not illustrated here.

Pressing cylinders 31 are arranged on the frame construction 10 above the component receiving device 2 in the center of the assembly installation 1 and it is possible to vertically lower a stamping device 3 by way of the pressing cylinders 31.

The component receiving device 2 is fastened on a table 12 so as to simplify fitting the component receiving device 2 with the radiator protective grid 20, which renders it possible for the component receiving device 2 to be transferred from a placing position into an assembly position when actuated by an external force. The assembly position describes a position of the component receiving device 2 directly below the stamping device 3 or a stamp 3 of the stamping device 3, and the placing position describes a position of the component receiving device 2 outside the effective radius of the stamping device 3.

The assembly installation 1 is fitted with a camera system 4 for performing quality control procedures and so as to ensure a flawless operation, the camera system optically checking prior to and after an assembly step the complete components 20 that are fixed in the component receiving device 2.

The assembly installation 1 is fitted with a labeling machine 5 for identifying components 21, 22, 23 that are joined in the intended manner, the labeling machine 5 being arranged below the component receiving device 2. The procedure of applying a label to the complete part 20 is performed by a blow head.

In order to assemble geometrically different complete components 20, the assembly installation 1 contains component receiving devices 2 and stamping devices 3 that are adjusted to suit the various components of the complete component 20. The assembly installation 1 is converted for each complete component 20, wherein the various stamping devices 3 are housed in a stamp exchanging mounting arrangement 16 above the pressing cylinder 31.

Figure 4:
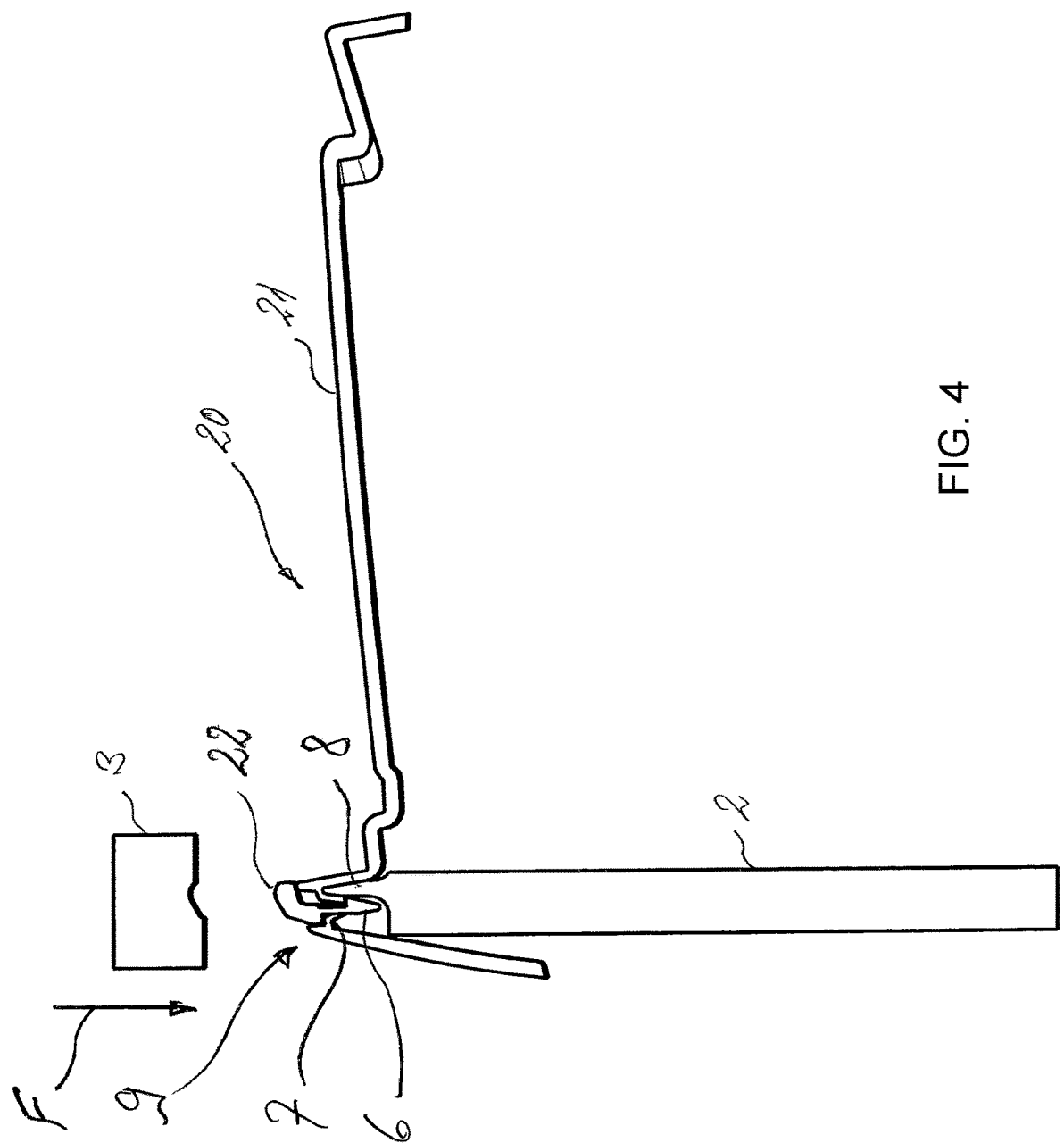
FIG. 4 is a sectional view of a radiator grill with a joined chrome frame as well as a complete component with a schematically illustrated component receiving device and stamping device in a raised position.

FIG. 4 illustrates a sectional view of the radiator protective grid 21 with a joined chrome grid 22 as a complete component with a schematically indicated component receiving device 2 and stamping device 3 after latching a chrome frame-side latching hook 6 to a radiator grill-side latching or joining contour 7. The radiator protective grid 21 with the pre-assembled chrome frame 22, in other words the chrome frame that has already been placed on said radiator protective grid, is supported on an inclined tooth contour 8 of the component receiving device 2 in the region of the respective latching site 9. As a consequence, during the course of the pressing force F that is exerted from above by the stamping device 3, the radiator protective grid 21 is pressed over on the latching site 9 so that owing to the counter pressure, in other words the counter force from below that counteracts the pressing force F from the component receiving device 2, a reliable latching arrangement is provided between the chrome frame-side latching hook 6 with the radiator grill-side latching or joining contour 7.

The invention is not limited to the above-described exemplary embodiment. On the contrary, other variants of the invention can be derived therefrom by the person skilled in the art without departing from the subject matter of the invention. In addition, in particular, all the individual features that are described in conjunction with the exemplary embodiment can also be combined with one another in another manner without departing from the subject matter of the invention.

The invention claimed is:

1. An assembly installation for fixing latching sites of components of a component assembly, the latching sites each defined by a respective latching hook and a respective joining contour, the respective joining contour defining a corresponding groove, the assembly installation, comprising:
   a horizontally-oriented component receiving device having inclined tooth contours each disposed and dimensioned for engaging respective ones of the latching sites by insertion into the corresponding groove and for supporting the component assembly in a region of the respective latching sites during fixing of the latching sites, said inclined tooth contours each having a respective inclined face constructed for engaging corresponding ones of the respective joining contours and supporting the respective joining contour in a direction transverse to the vertical pressing force, said inclined tooth contours being of sufficient length to provide clearance for the respective latching hook when the respective latching hook is latched with the respective joining contour; and
   a stamping device configured so as to vertically lower into an end position in such a manner that in the end position a measured vertical pressing force is exerted onto the component assembly, the measured vertical pressing force being of such a measured amount as to form a latching or pressing together of the components, each of said inclined tooth contours supporting a respective latching site and counteracting the vertical pressing force at said respective latching site.

2. The assembly installation according to claim 1, wherein said stamping device has a stamping surface facing the component assembly, said stamping surface having a rubber coating with a surface characteristic that corresponds to a surface contour of the component assembly.

3. The assembly installation according to claim 2, further comprising a stamp exchanging mounting configuration having a number of stamping devices that are different with regard to said stamping surface so as to exchange out said stamping devices.

4. The assembly installation according to claim 1, further comprising a camera system configured for checking the component assembly with regard to a latching state or a pressing state.

5. The assembly installation according to claim 4, further comprising a labeling machine configured for providing the component assembly with a label, the component assembly having been latched or pressed and checked by means of said camera system.

6. The assembly installation according to claim 1, further comprising a table that is actuated by an external force and configured for transferring said component receiving device from a placing position that is disposed outside an effective area of said stamping device into an assembly position below said stamping device.

7. A method for automatically joining components in an assembly installation, which comprises the steps of:
   providing an assembly installation according to claim 1;
   in a first processing step, positioning a first component on a second component thus forming a component assembly;
   in a second processing step, placing the component assembly in the horizontally-oriented, component receiving device of the assembly installation; and
   in a third processing step, guiding the stamping device in a direction of the component assembly in such a manner that the component assembly is influenced in an end position of the stamping device with a pressing force that provides a latching or pressing configuration of the components, and supporting the component assembly during the third step in regions of the respective latching site by the inclined tooth contours of the component receiving device with the first component against the pressing force.

8. The method according to claim 7, wherein:
   the second step occurs in a placing position of the component receiving device that is disposed outside an effective area of the stamping device; and
   the third step occurs in an assembly position of the component receiving device, wherein the component receiving device is transferred from the placing position into the assembly position and the transfer is supported by an external force.

9. The method according to claim 8, wherein prior to or after the third step, in the placing position, an installation-side camera system checks whether the components are disposed in desired positions.

10. The method according to claim 9, which further comprises providing the component assembly that is checked by means of the installation-side camera system, with a label by means of an installation-side labeling machine for purposes of tracking.

11. The method according to claim 1, which further comprises providing a fixing configuration of the component assembly after the second step, the fixing configuration being supported by an external force, by means of component receiving device-side fixing elements.

* * * * *